United States Patent [19]

Martin et al.

[11] 3,998,384
[45] Dec. 21, 1976

[54] PNEUMATIC THERMOSTAT ASPIRATOR

[75] Inventors: Ronald L. Martin, Mount Prospect; Donald E. Meyer, Cicero, both of Ill.

[73] Assignee: Honeywell Inc., Minneapolis, Minn.

[22] Filed: Apr. 23, 1973

[21] Appl. No.: 353,261

Related U.S. Application Data

[62] Division of Ser. No. 128,771, March 29, 1971, abandoned.

[52] U.S. Cl. .................................. 236/87; 137/833; 236/DIG. 19; 417/151
[51] Int. Cl.² ........................................ G05D 23/12
[58] Field of Search ................. 417/151; 137/833; 236/87, DIG. 19

[56] References Cited

UNITED STATES PATENTS

| | | |
|---|---|---|
| 1,998,008 | 4/1935 | Giesl-Gieslingen ......... 236/DIG. 19 |
| 3,232,112 | 2/1966 | Wehlau ............................ 73/349 |
| 3,334,401 | 8/1967 | Hopkinson, Jr. ............. 137/833 X |
| 3,464,230 | 9/1969 | Rietdijk ............................. 62/500 |

*Primary Examiner*—William E. Wayner
*Assistant Examiner*—Larry I. Schwartz
*Attorney, Agent, or Firm*—Trevor B. Joike

[57] ABSTRACT

An aspirator for a pneumatic thermostat including a slit restriction which provides a relatively thin and wide jet of air. The large surface area of the flat jet entrains a substantial volume of ambient air and results in a large ambient air flow past the thermostat. The slit restriction is formed either of a shallow channel in a portion of the aspirator housing or of a cutaway portion in a relatively thin sheet of material interposed between two housing halves of the aspirator.

6 Claims, 4 Drawing Figures

INVENTORS
RONALD L. MARTIN
DONALD E. MEYER

ATTORNEY.

PNEUMATIC THERMOSTAT ASPIRATOR

This is a division of application Ser. No. 128,771, filed Mar. 29, 1971 now abandoned.

BACKGROUND AND SUMMARY OF THE INVENTION

This invention relates to an aspirator for use in conjunction with a pneumatic thermostat or the like. More particularly this invention relates to a novel restriction for use within such an aspirator.

In a temperature control system having a plurality of thermostats it is occasionally desirable to have one or more thermostats tamper-proof or protected from accidental damage. This is usually accomplished by mounting the thermostat within a wall box in a recess in the wall, and covering the thermostat with a coverplate which is substantially flush with the wall surface. The thermostat, when so mounted, tends to sense and control primarily the temperature of the wall. It is desired, of course, that the thermostat control the temperature of the entire space. In order to overcome this problem ambient air is pumped from the space into the wall box where the ambient air temperature is sensed. In a pneumatic temperature control system this pumping action is usually provided by an aspirator.

The principle of operation of an aspirator is quite simple. A high velocity jet of air, emitted from a nozzle or restriction, tends to entrain additional air in the vicinity of the nozzle due to the low pressure associated with the high velocity stream. The aspirator utilizes this effect to pump ambient air past the thermostat. The nozzle or restriction of the aspirator is arranged to direct a high velocity jet of air towards an outlet slot or louver in the coverplate. Air within the wall box in the vicinity of the thermostat is entrained by this stream and is exhausted out through the slot in the coverplate. Accordingly air is drawn into the wall box through an inlet slot or louver in the coverplate, thereby providing a continuous stream of ambient air past the thermostat.

Two characteristics of an aspirator are considered in determining its efficiency: the volume of primary air consumed by the aspirator; and the volume of secondary or ambient air entrained and circulated past the thermostat. It is desirable to minimize the former to keep system operation costs down, and to maximize the latter to ensure accurate space temperature control. A measure of the efficiency of an aspirator is given by the ratio of the ambient air entrained to the primary air consumed.

Prior art devices have generally utilized a simple annular nozzle connected in series with a restriction for providing the high velocity jet. The nozzle is merely aimed at the outlet in the coverplate as is shown in Wehlau U.S. Pat. No. 3,232,112. Such arrangements, however, are relatively inefficient. This low efficiency may result either in high primary air consumption or in the thermostat being unduly influenced by a hot or cold wall. For example, if the wall in which the thermostat is located is cold, the thermostat will in effect try to raise the wall temperature. The likely result is an uncomfortably high space temperature.

The subject invention provides a high efficiency aspirator, i.e. one having high ambient air flow while maintaining low primary air consumption, by utilizing a slit or shallow channel restriction. A relatively wide and thin jet of air is emitted by the aspirator and directed towards the outlet slot or louver in the coverplate. The slit restriction provides a jet of air having a substantially increased jet surface area as seen by ambient air within the wall box as opposed to the prior art annular restriction. This increased surface area results in significantly more ambient air being entrained by the jet and circulated past the thermostat without any increase in primary air consumption. The thermostat used in combination with an aspirator having a slit restriction will thus more accurately control the temperature of the space and will be influenced significantly less by a hot or cold wall.

A further advantage of the subject invention resides in the combined use of the slit restriction as both a restriction and a nozzle. Most prior art aspirators have used a restriction connected in series with an annular nozzle.

Other advantages of the subject invention will become apparent upon a reading of the detailed description of the invention in view of the drawing wherein.

DETAILED DESCRIPTION OF THE INVENTION

Figure 1:
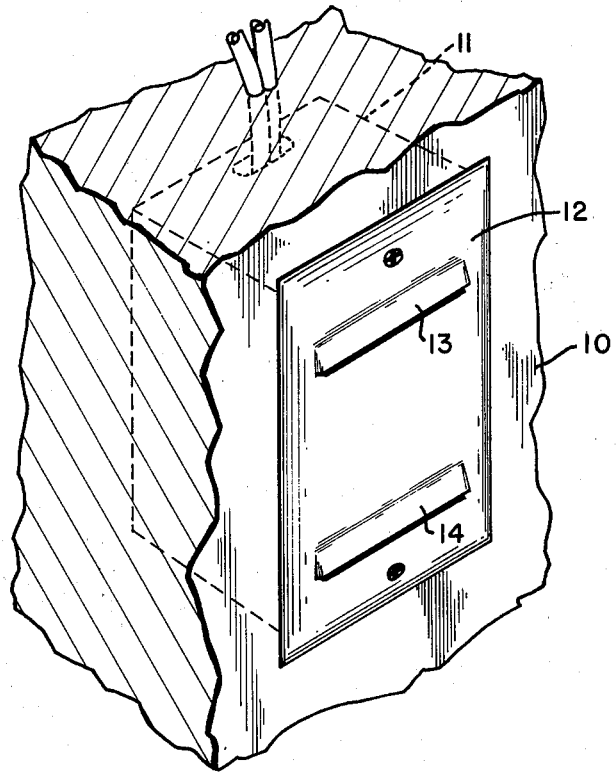
FIG. 1 is a perspective of a wall box and thermostat coverplate arrangement set in a wall of a space.

A section 10 of a wall is shown in FIG. 1 having a wall box 11 mounted in a recess therein. A coverplate 12 associated with the wall box has two slots of louvers 13 and 14 in the face thereof allowing communication between the space wherein the wall is located and the interior chamber 15 of the wall box.

Figure 2:
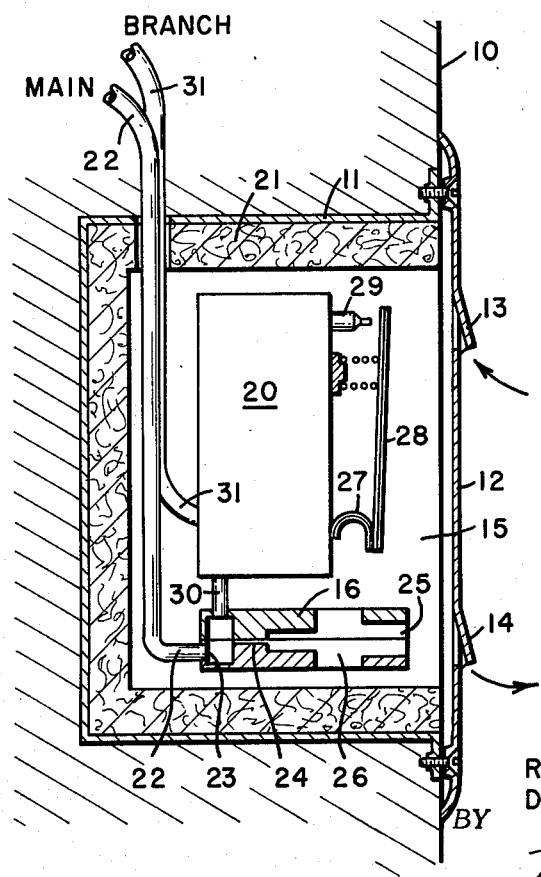
FIG. 2 is a cross-sectional view of a wall box with a thermostat and aspirator mounted therein.

In FIG. 2 a pneumatic thermostat 20 is mounted in chamber 15 of the wall box 11. The wall box 11 is insulated with suitable means 21 to minimize the effect of the wall temperature on the thermostat 20. A main pressure conduit 22 provides a source of primary air and is connected to inlet means 23 of the aspirator 16. In communication with inlet means 23 is a slit or shallow channel restriction 24 in the aspirator. This restriction provides and directs a relatively thin and wide jet of air through exhaust means 25 of the aspirator and in the direction of egress slot means 14 of the coverplate 12. Air within the chamber 15 enters intake means 26 of the aspirator, is entrained by this jet of air, and is caused to depart the chamber through egress slot 14. Accordingly ambient air is caused to enter the chamber 15 through ingress slot means 13. This air circulates past bimetal 27 which causes the movement of flapper 28 and the variable restriction of nozzle 29 in response to changes in the temperature of the air circulated thereby.

The thermostat 20 is provided with main pressure through conduit 22, inlet means 23 of the aspirator and conduit 30 between the aspirator and the thermostat 20. The output of the thermostat is transmitted through branch line 31 to a diaphragm operator or valve or the like (not shown).

Figure 3:
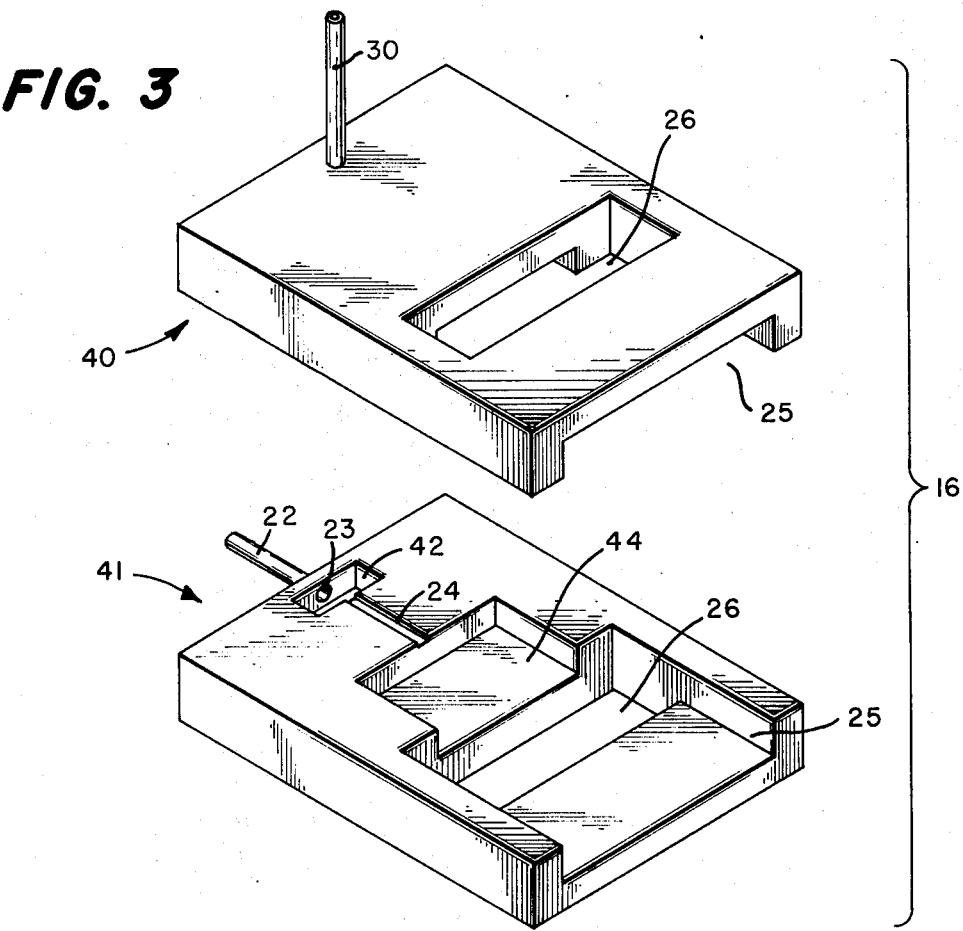
FIG. 3 is an exploded view of the preferred embodiment of the aspirator.

FIG. 3 discloses the preferred embodiment of the aspirator 16 shown in FIG. 2. The aspirator comprises a housing having two portions or halves 40 and 41 which may be suitably bonded or welded together. Portion 41 has associated therewith inlet means 23 arranged to be connected to the source of primary air pressure via conduit 22. Primary air is transmitted through chamber 42 in portion 41 to conduit 30 which is connected to the thermostat 20. In communication with inlet means 23 and chamber 42 is a slit or shallow channel restriction 24 formed in portion 41 of the housing. Restriction 24 is preferably about 0.020 inches wide, 0.002 inches deep, and 0.150 inches long. The jet of air upon issuing from restriction 24, tends to widen as it passes through region 44 of the aspirator. The jet, upon passing secondary air intake means 26, entrains secondary or ambient air and exhausts this air through exhaust means 25.

The width, depth, and length of the slit restriction 24 my be varied, but the dimensions are preferably kept in proportions such that no more than 600 standard cubic centimeters of air per minute (sccm) flow therethrough when the primary air pressure is 18 psi. The surface texture of the walls of the restriction needs to be considered when the dimensions of the restriction are determined. The ratio of the width of the restriction 24 to the depth thereof is, however, preferably equal to or greater than about 10 to 1 to ensure a flat jet. Using a restriction having the above described dimensions, and with a primary air flow of 600 sccm at 18 psi, the volume of secondary air entrained is found to be in excess of 12,000 sccm. Thus the efficiency, that is the ratio of secondary air flow to primary air flow, is greater than 20 to 1.

Figure 4:
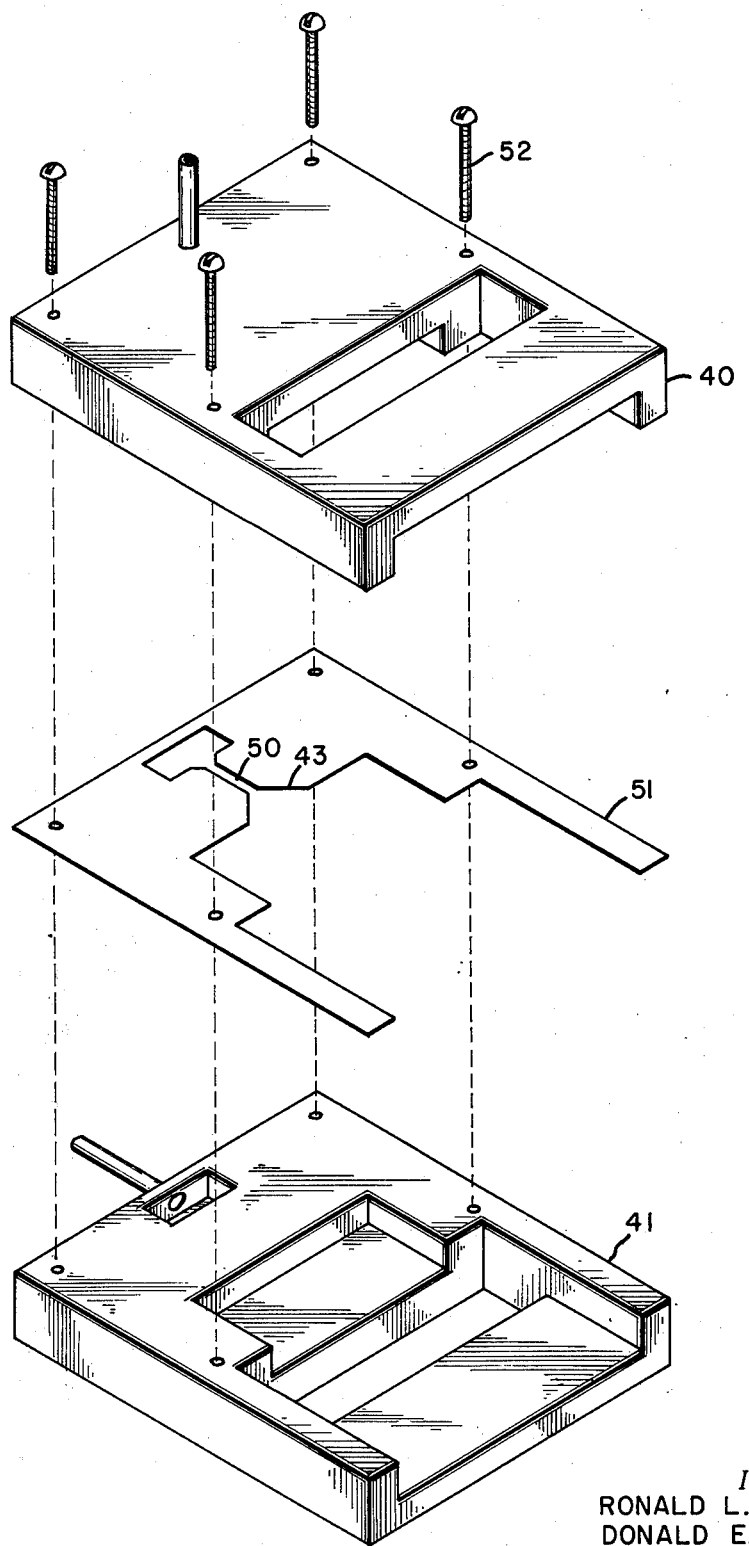
FIG. 4 is an alternative embodiment of the aspirator.

An alternative to the embodiment disclosed in FIG. 3 is illustrated in FIG. 4. Here the slit restriction, instead of being formed in a portion of the housing of the aspirator, comprises a cut-away portion 50 of a relatively thin sheet of material 51 interposed between the first and second portions of the housing 40 and 41. The thickness of the sheet 51 is preferably about 0.002 inches. Again the width of the restriction or cut-away portion 50 is approximately 0.020 inches and the length is approximately 0.150 inches. In this embodiment the two portions 40 and 41 and sheet of material 51 are fastened together by a plurality of bolts or the like 52. The downstream end of the cut-away portion 50 is illustrated as having a lateral flare 43 to promote the widening of the jet as it issues from the restriction.

While references have been made throughout this detailed description to specific dimensions and pressures within the context of a temperature control system it is to be understood that the scope of the invention is to be limited only by the scope of the appended claims.

The embodiments of the invention in which an exclusive property or right is claimed are defined as follows:

1. In a pneumatic condition control system including a pneumatic condition control device mounted in a substantially enclosed chamber, coverplate means associated with the chamber, the coverplate having ingress and egress slot means, and a source of primary air under pressure, the improvement comprising:
   an aspirator mounted in the chamber and connected to the source of primary air under pressure, said aspirator comprising:
   a housing;
   inlet means in the housing connected to the source of primary air under pressure;
   ambient air intake means in the housing; and,
   a slit restriction comprising a shallow channel formed in a portion of the housing of the aspirator and arranged to communicate with the inlet means and to direct a relatively thin and wide jet of primary air past the ambient air intake means, the jet thereby entraining ambient air in the chamber, whereby ambient air is drawn into the chamber through the ingress slot means and is caused to depart the chamber through the egress slot means.

2. In a pneumatic condition control system as described in claim 1, wherein the condition control device comprises a temperature responsive thermostat arranged to control the temperature of a space, the improvement wherein the jet of primary air is arranged to entrain air in the chamber whereby ambient air from the space is drawn into the chamber through the ingress slot means past the thermostat, and is thereafter caused to depart the chamber through the egress slot means back into the space.

3. In a pneumatic condition control system including a pneumatic condition control device mounted in a substantially enclosed chamber, coverplate means associated with the chamber, the coverplate having ingress and egress slot means, and a source of primary air under pressure, the improvement comprising an aspirator mounted in the chamber and connected to the source of primary air under pressure, said aspirator comprises:
   a housing having first and second portions;
   inlet means in the housing connected to the source of primary air under pressure;
   ambient air intake means in the housing; and,
   a slit restriction comprising a cutaway portion of a relatively thin sheet of material interposed between the first and second portions of the housing and arranged to communicate with the inlet means and to direct a relatively thin and wide jet of primary air past the ambient air intake means in the direction of the egress slot means, the jet thereby entraining ambient air in the chamber, whereby ambient air is drawn into the chamber through the ingress slot means and is caused to depart the chamber through the egress slot means.

4. In a pneumatic condition control system as described in claim 3, wherein the condition control device comprises a temperature responsive thermostat arranged to control the temperature of a space, the improvement wherein the jet of primary air is arranged to entrain air in the chamber whereby ambient air from the space is drawn into the chamber through the ingress slot means past the thermostat, and is thereafter caused to depart the chamber through the egress slot means back into the space.

5. In a pneumatic condition control system including a pneumatic condition control device mounted in a substantially enclosed chamber, coverplate means associated with the chamber, the coverplate having ingress and egress slot means, and a source of primary air under pressure, the improvement comprising an aspirator mounted in the chamber and connected to the source of primary air under pressure, said aspirator comprising:
   a housing having two opposite ends and a top and a bottom;
   inlet means, connected to the source of primary air under pressure, formed in one end, and exhaust means formed in the other end of said housing;
   ambient air intake means formed in the top and bottom of said housing; and,
   a slit restriction located between said ends of said housing and upstream of said ambient air intake means and arranged to communicate with the inlet means and to direct a relatively thin and wide jet of primary air past the ambient air intake means in the direction of the egress slot means, the jet thereby entraining ambient air in the chamber, whereby ambient air is drawn into the chamber through the ingress slot means and is caused to depart the chamber through the egress slot means.

6. In a pneumatic condition control system as described in claim 5, wherein the condition control device comprises a temperature responsive thermostat arranged to control the temperature of a space, the improvement wherein the jet of primary air is arranged to entrain air in the chamber whereby ambient air from the space is drawn into the chamber through the ingress slot means past the thermostat, and is thereafter caused to depart the chamber through the egress slot means back into the space.

* * * * *